(12) United States Patent
Ohlman et al.

(10) Patent No.: US 6,578,640 B1
(45) Date of Patent: Jun. 17, 2003

(54) APPARATUS AND METHOD FOR PREPARING AGRICULTURAL GROUND FOR PLANTING

(75) Inventors: Kevin F. Ohlman, Central City, NE (US); Donald F. Ohlman, Central City, NE (US); David D. Ohlman, Ft. Wayne, IN (US)

(73) Assignee: Ohlman Engineering, Central City, NE (US)

( * ) Notice: Subject to any disclaimer, the term of this patent is extended or adjusted under 35 U.S.C. 154(b) by 0 days.

(21) Appl. No.: 09/789,263

(22) Filed: Feb. 20, 2001

(51) Int. Cl.⁷ ............................................. A01B 49/02
(52) U.S. Cl. ...................................... 172/149; 172/178
(58) Field of Search ........................... 172/143, 145, 172/146, 147, 148, 149, 152, 153, 157, 176, 178, 179

(56) References Cited

U.S. PATENT DOCUMENTS

| | | | | |
|---|---|---|---|---|
| 3,811,387 A | * | 5/1974 | Meiners | |
| 3,828,702 A | * | 8/1974 | Bowman | |
| 4,088,083 A | * | 5/1978 | Dail, Jr. et al. | |
| 4,212,254 A | * | 7/1980 | Zumbahlen | |
| 4,315,547 A | * | 2/1982 | Rau et al. | |
| 4,554,977 A | * | 11/1985 | Vachon | |
| 4,821,809 A | * | 4/1989 | Summach et al. | |
| 5,161,622 A | * | 11/1992 | Godbersen | |
| 5,285,854 A | * | 2/1994 | Thacker et al. | |
| 5,529,128 A | * | 6/1996 | Peterson et al. | 172/145 |
| 5,590,721 A | * | 1/1997 | Van Mill | |
| 5,769,170 A | * | 6/1998 | Skjaeveland | |
| 5,862,764 A | * | 1/1999 | Umemoto | |
| 6,068,061 A | * | 5/2000 | Smith et al. | |
| 6,257,342 B1 | * | 7/2001 | Szatko | |
| 6,276,462 B1 | * | 8/2001 | Dietrich, Sr. | |

OTHER PUBLICATIONS

Bush Hog Soil Conservur SC–9000 brochure, Oct. 1983, 4 pages.*
Perfecta II S–Tine Cultivator brochure, Oct. 1989, 1 page.*
Wil–Rich, Wil–Till Field Cultivator brochure, Oct. 1981, 2 pages.*
KMC, S–Tine Field Cultivator brochure, Oct. 1989, 2 pages.*

* cited by examiner

*Primary Examiner*—Victor Batson
(74) *Attorney, Agent, or Firm*—McKee, Voorhees & Sease, P.L.C.

(57) ABSTRACT

The apparatus of the present invention prepares agricultural ground for planting by performing multiple functions in a single pass over the field. The apparatus includes rolling choppers and coulters for cutting crop residue, and disks and rippers for tilling the soil. The apparatus also includes a harrow for further mixing the soil and crop residue, and spreading the mixture evenly over the field. The coulters, disks, and rippers are mounted in sets on independent arms which float freely upwardly and downwardly to accommodate variations in the ground surface.

14 Claims, 4 Drawing Sheets

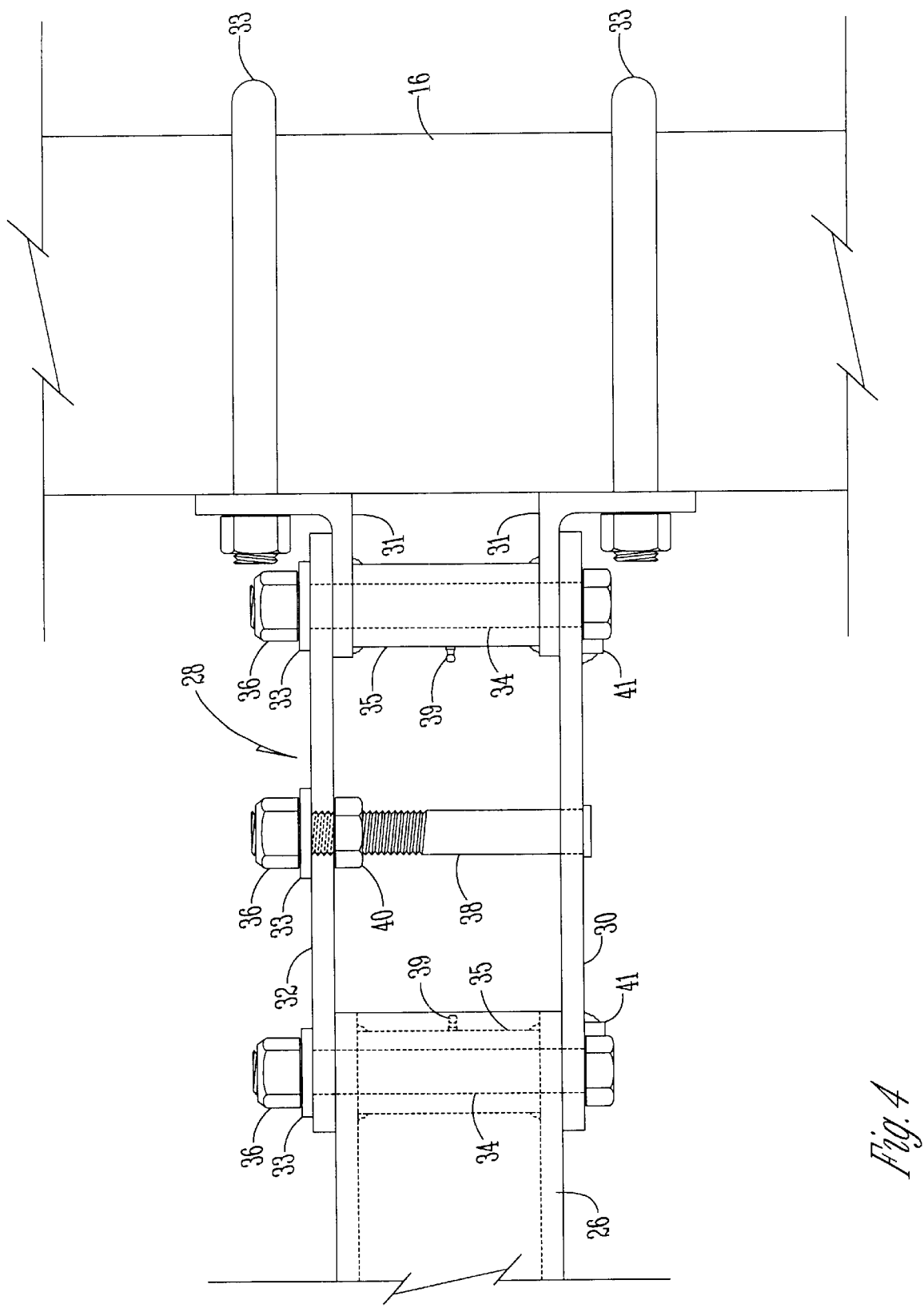

APPARATUS AND METHOD FOR PREPARING AGRICULTURAL GROUND FOR PLANTING

BACKGROUND OF THE INVENTION

Many different types of equipment and methods have been used to prepare agricultural ground for planting. Each apparatus and method has its own advantages and disadvantages. A common goal to all is to minimize time and expense while best preparing the ground for planting of crops. No-tillage systems present one extreme, wherein no work is done to the ground after the fall harvest or before spring planting. At the other extreme are systems that make multiple passes over the ground to cut crop residue, rip the soil to minimize compaction, and level the terrain. However, no-till systems generally do not adequately prepare the soil for spring planting, and multi-pass systems are time consuming and expensive.

Prior art ground-working tools also have problems resulting from wear, which requires time consuming and costly replacement of bushings, bearings and the like, since there is no adjustability to account for component wear.

Therefore, a primary objective of the present invention is the provision of an improved apparatus and method for preparing agricultural soil for planting.

A further objective of the present invention is a provision of a multi-function ground-working apparatus.

Another objective of the present invention is the provision of a method of cutting residual crop, scalping the soil, cutting the soil to loosen compaction, and spreading and mixing the soil and crop residue in a single pass over the ground.

A further objective of the present invention is the provision of an improved ground-working apparatus having multiple tools mounted on independent arms to maintain ground-engaging contact over all ground surface changes.

A further objective of the present invention is the provision of an improved apparatus for preparing ground for planting, which is economical to manufacture, and durable and efficient in use.

These and other objectives will become apparent from the following description of the invention.

SUMMARY OF THE INVENTION

The improved agricultural ground-working apparatus of the present invention includes a primary cross bar adapted to be connected to a tractor for pulling the apparatus through a field. A plurality of arms extends rearwardly from the cross bar, with each arm being independently pivotally mounted to the cross bar with a parallel linkage assembly. The pivotal linkage assembly allows the arms to float upwardly and downwardly independent of one another as the ground terrain beneath each arm varies.

A plurality of ground-working tools are mounted on each arm. More particularly, each arm includes a coulter for cutting residual crop, a pair of scalping disks for scalping the soil and being angled so as to form ridges, and a ripper for cutting the soil to loosen compaction. Preferably, rolling choppers are mounted on the cross bar ahead of the arms for cutting residual crop. A spring finger harrow is mounted to another set of arms extending from the cross bar, so as to be located behind the tool arms. The harrow spreads and mixes the soil and residual crop.

In using the apparatus, the crop cutting by the rolling choppers and coulters, the soil scalping by the disks, the soil ripping by the rippers, and the spreading and mixing by the harrow are accomplished in a single pass over the ground by the tractor pulling the apparatus. Thus, the method of ground preparation minimizes the time and expense while effectively preparing the ground for spring planting.

BRIEF DESCRIPTION OF THE DRAWINGS

FIG. 4 is an enlarged top view taken along lines 4—4 of FIG. 2, and showing connected the parallel linkage assembly for pivotally connecting the tool arms to the cross bar.

DETAILED DESCRIPTION OF THE DRAWINGS

Figure 1:
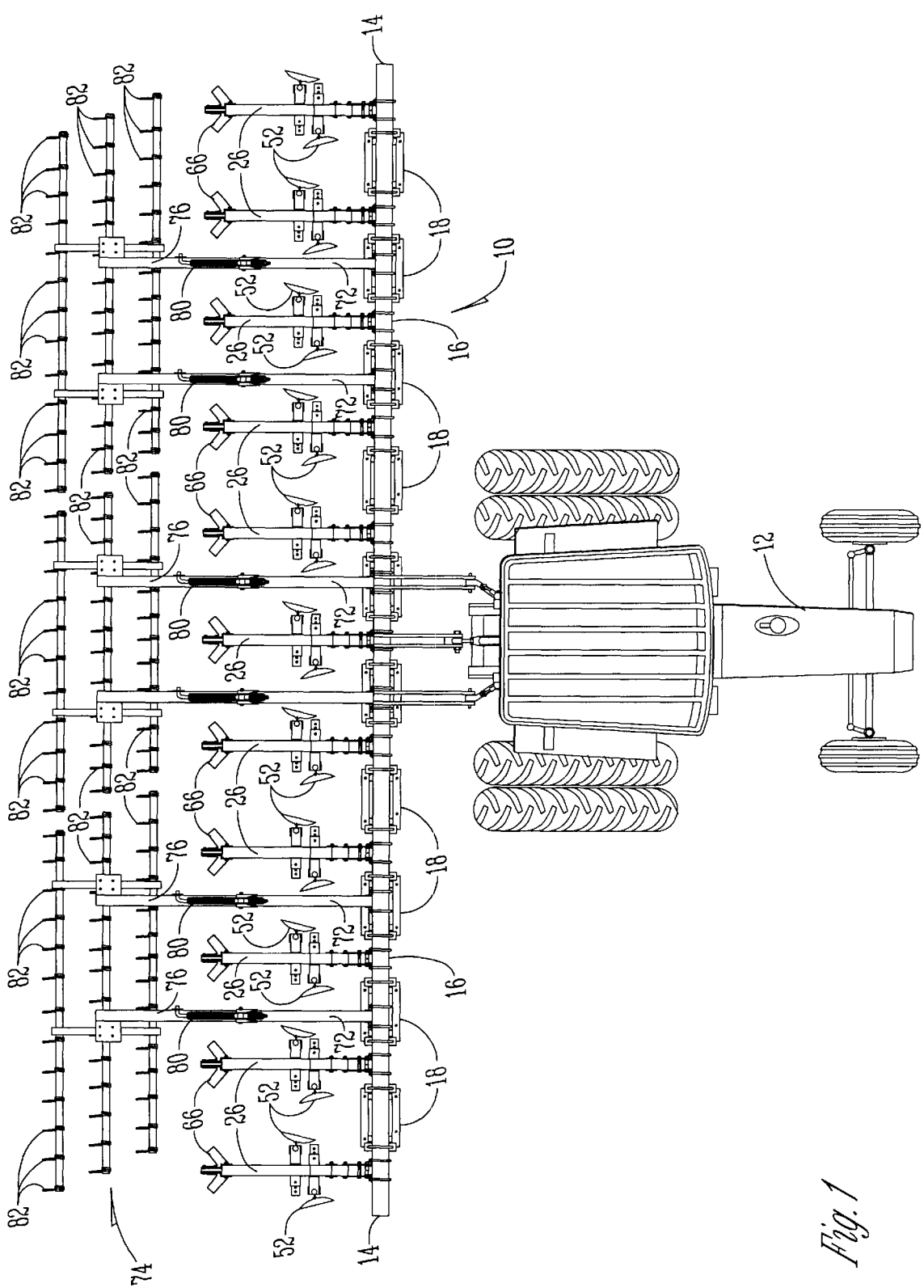
FIG. 1 is a top plan view of the apparatus connected to a tractor.

In FIG. 1, the multi-function, pre-planting ground-working apparatus of the present invention is generally designated by the reference numeral 10. The apparatus 10 is adapted to be pulled by a tractor 12 to cut crop residue and work the soil after fall harvest or before spring planting.

The apparatus 10 generally includes a frame 14 with a plurality of tools mounted thereon.

More particularly, the frame 14 includes a cross bar 16, which preferably is a square steel tube. A plurality of rolling choppers 18 are mounted to the cross bar 16. Each chopper 18 is mounted for rotation about a horizontal axis, and includes a plurality of blades 24 that are adapted to engage the ground to cut crop residue, such as corn stalks. The choppers 18 are rotatably supported between a pair of support arms 20 extending downwardly from the cross bar 16. The support arms 20 may be connected to the cross bar 16 in any convenient manner, such as by clamps 22, welding, or bolts.

Figure 3:
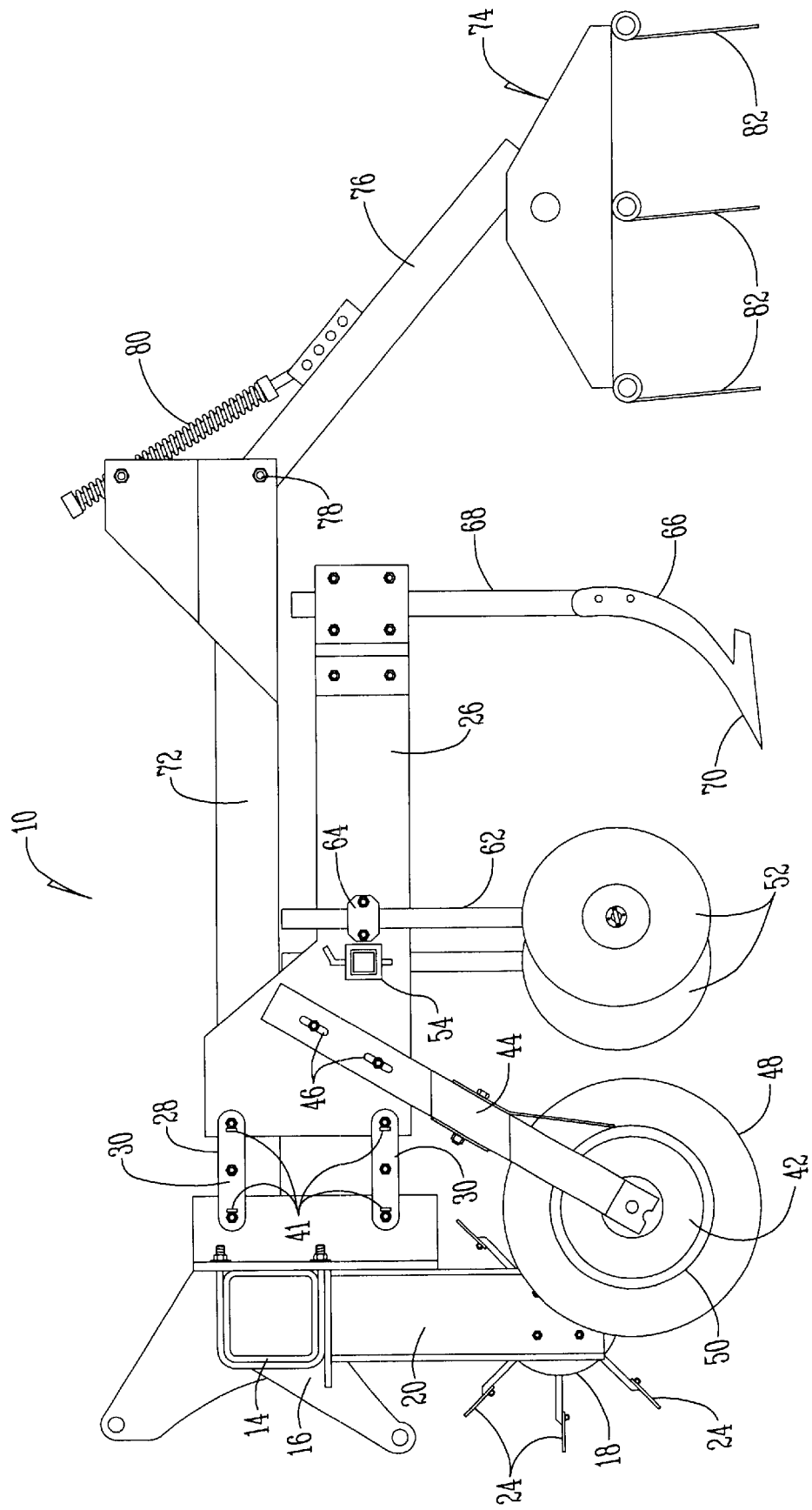
FIG. 3 is a side elevation view of the apparatus of the present invention.

The frame 14 includes a plurality of hollow arms 26 extending rearwardly from the cross bar 16. Each arm 26 is independently and pivotally mounted to the cross bar 16 using a parallel linkage assembly 28. As best seen in FIGS. 3 and 4, the linkage assembly includes an upper and lower pair of spaced apart plates 30, 32. The linkage assembly 28 is bolted at one end to the arm 26 and at the opposite end to a pair of angle irons 31, which in turn are clamped to the cross bar 16 with U-shaped clamps 33.

The spacing between the plates 30, 32 is adjustable to accommodate for manufacturing tolerances and for normal wear during use of the apparatus 10. A pair of bolts 34 extend through aligned holes in the plates 30, 32, and bushings 35, 37, and are retained by lock nuts 36. Washers 33 are positioned between the plate 32 and the nuts 36. The front bushings 35 are welded to the inside of the angle irons 31, while the rear bushings 37 are welded to the inside of the arms 26. The space between the plates 30, 32 is controlled by a central bolt or shaft 38 having one end welded to the plate 30, and the opposite end extending through a hole in plate 32. The threads on the central bolt 38 extend between the plates 30, 32 so as to receive a nut 40, as seen in FIG. 4. The position of the nut 40 on the bolt 38 determines the adjustable position of plate 32 relative to plate 30, to accommodate wear on the plates 30, 32, angle irons 31 or arms 26. Thus, by threading the nut 40 upwardly or downwardly along the bolt 38, the spacing between the plates 30, 32 can be decreased or increased, respectively. Another washer 33 and lock nut 36 is provided on the end of the central bolt 38. The bushings 35, 37 minimize wear on the components thereby minimizing lateral or fish tail movement of the frame 14. Grease zerks 39 are provided on each of the four bushings 35, 37, as best seen in FIG. 4. Tabs 41 are welded on the plates 30 and function to keep the heads of the bolts 34 from turning. Thus, when the link plates 30, 32 move, the bolts 34 turn within the greased bushings 35, 37. The bolt 38 and nuts 40, 36 tie the link plates 30, 32 together.

A coulter 42 is mounted on each arm 26. The coulter support arms 44 are bolted to the frame arms 26 via elongated slots 46 such that the vertical position of the coulter 42 can be adjusted. The coulter 42 includes an outer perimeter cutting edge 48 adapted to slice into the ground as the apparatus 10 is pulled by the tractor 12. The depth of the cut is limited by a reduced-diameter annular rim 50.

Figure 2:
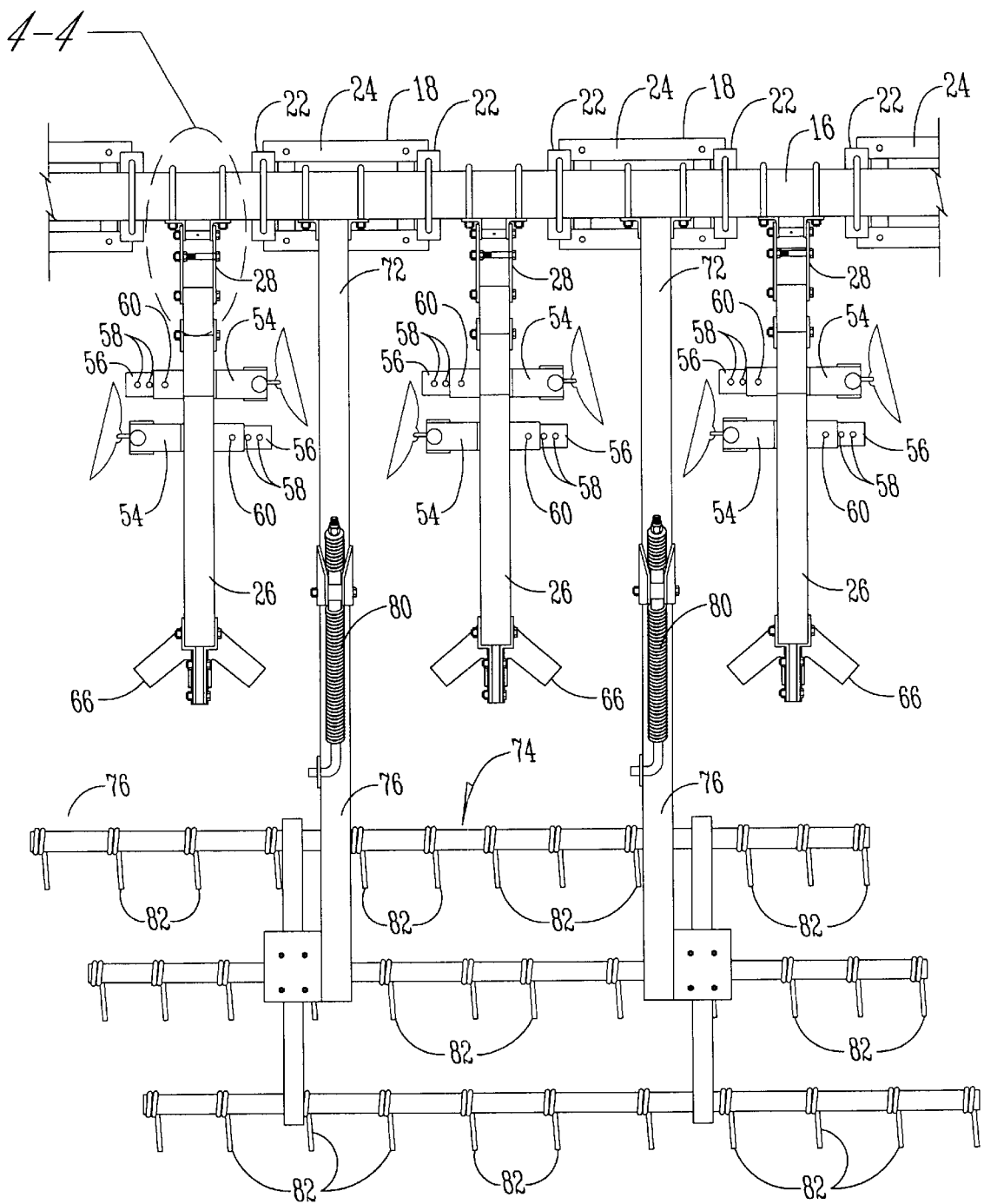
FIG. 2 is an enlarged top view of a portion of the apparatus showing one pair of frame arms and one pair of harrow arms.

Also mounted on each frame arm 26 is a pair of scalping disks 52. As seen in FIG. 2, the forward edge of the disks 52 are turned inwardly so that as the disks cut through or scalp the ground, the soil is directed into a ridge between pairs of adjacent arms 26. The lateral spacing between each pair of disks 52 is adjustable via the mounting hardware of the disks. In a preferred embodiment, a transverse hollow tube 54 is welded or otherwise mounted to the frame arm 26. A female stub shaft 56 is slidably received within the tube 54, with the stub shaft 56 having a plurality of holes 58. A pin 60 extends through a hole in the tube 54 and one of the holes 58 into stub shaft 56 to fix the lateral position of,each disk. A leg 62 extends downwardly from the stub shaft 56 to support the disk 52. The vertical position of the disks 52 are also adjustable by sliding the leg 62 upwardly or downwardly through a collar or clamp 64 on the stub shaft 56, as best seen in FIG. 3.

Also mounted on each frame arm 26 is a ripper 66. The ripper 66 includes a leg 68 adjustably secured to the arm 26, and a blade 70 adapted to cut into the ground to loosen compaction of the soil and to cut crop residue in the grounds so as to mix crop residue with soil.

The apparatus 10 also includes a plurality of arms 72 extending rearwardly beyond the frame arms 26. Each pair of arms 72 is adapted to support a harrow section 74. Each harrow section 74 is supported by a pair of braces or legs 76 pivotally connected to the harrow arms 72 for pivotal movement about the axis of the mounting bolts 78. A spring-loaded rod 80 extends between the harrow arms 72 and the harrow legs 76 to normally bias each harrow section 74 into ground-engaging contact. The harrows 74 include a plurality of spring fingers 82 that function to spread and mix the soil and cut crop residue.

In using the apparatus 10 in the field, the various tools perform multiple functions to prepare the ground for planting, all in a single pass over the ground. As the apparatus 10 is pulled through the field by a tractor 12, the rolling choppers 18 cut residual crop lying on top of the ground. The cutting edge 48 of the coulters 42 also cut crop residue, while the disks 52 scalp the ground and reform the soil into ridges. The rippers 66 plow beneath the ground aside the ridge in the furrow to loosen the soil and thereby reduce compaction, while also tearing or pulling up crops residue in the ground. The harrow fingers 82 then spread the soil and further mix the soil and crop residue. It is understood that the apparatus 10 can be used in fields that may or may not have rows or ridges.

In use, the frame arms 26 pivot through the linkage assembly 28 so as to float freely upwardly and downwardly, thereby following the ground contour. Thus, as the ground contour varies over the width of the apparatus 10, the frame arms 26 with the coulters 42, disks 52, and rippers 66 will move upwardly and downwardly to remain in contact with the ground.

Thus, the present invention accomplishes at least all of the stated objectives.

The preferred embodiment of the present invention has been set forth in the drawings, specification, and although specific terms are employed, these are used in a generic or descriptive sense only and are not used for purposes of limitation. Changes in the form and proportion of parts as well as in the substitution of equivalents are contemplated as circumstances may suggest or render expedient without departing from the spirit and scope of the invention as further defined in the following claims.

What is claimed is:

1. A multi-function soil working apparatus adapted to be pulled by a tractor over agricultural ground to prepare the soil for planting, comprising:

a frame including a cross bar extending laterally relative to a direction of travel and a first arm extending rearwardly;

a cutting tool mounted on the frame to cut crop residue;

a coulter mounted on the frame to cut crop residue;

a pair of cooperating disks mounted on the frame to cut vegetation;

a ripper mounted on the frame to cut the soil and vegetation and reduce soil compaction;

a harrow mounted on the frame to spread and mix the soil and crop residue; and the first arm being pivotally mounted to the cross bar so as to float upwardly and downwardly in response to variations in the contour of the ground.

2. The apparatus of claim 1 further comprising a parallelogram linkage connecting the frame and the arm.

3. The apparatus of claim 2 wherein the parallelogram linkage includes opposite sides which are adjustably spaced from one another.

4. The apparatus of claim 1 further comprising a second arm pivotally mounted to the cross bar independently of the first arm for independent floating movement, and a second coulter, second pair of disks and a second ripper being mounted on the second arm.

5. The apparatus of claim 1 wherein the harrow is spring loaded.

6. The apparatus of claim 1 wherein the harrow is normally biased into a ground-engaging position.

7. The apparatus of claim 1 wherein the cutting tool is a rolling chopper with a plurality of laterally extending blades.

8. A method of preparing agricultural ground and soil for planting, comprising:

(a) cutting crop residue on the ground with a cutting tool;

(b) scalping the ground with disks to form ridges and furrows;

(c) ripping the ground in the furrows with rippers;

(d) spreading and mixing the soil and crop residue while maintaining the ridges and furrows; and steps (a) through (d) being performed in a single pass over the ground.

9. The method of claim 8 further comprising maintaining constant contact between the ground and the cutting tool, disks and rippers.

10. The method of claim 9 wherein constant ground contact is maintained by mounting the cutting tool, disks and rippers on a floating arm to follow the ground contour.

11. The method of claim 8 wherein the cutting of crop residue is performed with a rolling chopper.

12. The method of claim 8 wherein the cutting of crop residue is performed with a coulter.

13. The method of claim 8 wherein the spreading and mixing step is performed with a harrow.

14. A multi-function soil working apparatus adapted to be pulled by a tractor over agricultural ground to prepare the soil for planting, comprising:

a frame, cutting tools mounted on the frame to cut crop residue;

disks mounted on the frame to form ridges and furrows of soil and cut vegetation;

rippers mounted on the frame to cut the soil and vegetation in the furrows and reduce soil compaction;

harrows mounted on the frame to spread and mix the soil and crop residue while maintaining the ridges;

the frame including a single cross bar and rearwardly extending arms, with disks, rippers, and harrows being mounted on the arms; and the arms being pivotally mounted to the cross bar so as to float upwardly and downwardly in response to variations in the ground contour.

* * * * *